(12) United States Patent
Shirokoshi et al.

(10) Patent No.: US 6,837,623 B2
(45) Date of Patent: Jan. 4, 2005

(54) 4-POINT CONTACT BALL BEARING

(75) Inventors: Norio Shirokoshi, Nagano-ken (JP); Harushige Aoyagi, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/252,365

(22) Filed: Sep. 24, 2002

(65) Prior Publication Data

US 2003/0059142 A1 Mar. 27, 2003

(30) Foreign Application Priority Data

Sep. 25, 2001 (JP) ........................................ 2001-290963

(51) Int. Cl.$^7$ ............................................... F16C 33/64
(52) U.S. Cl. .................................... 384/516; 29/898.06
(58) Field of Search ................................. 384/513, 516, 384/507; 29/898.06–898.066; 451/52, 114

(56) References Cited

U.S. PATENT DOCUMENTS

| | | | |
|---|---|---|---|
| 1,587,184 A | 6/1926 | Riebe | |
| 2,142,474 A | 1/1939 | Langhaar | |
| 3,370,899 A * | 2/1968 | Eklund | 384/516 |
| 3,670,462 A * | 6/1972 | Robinson | 451/114 |
| 4,334,721 A * | 6/1982 | Satoh et al. | 384/516 |
| 4,565,457 A * | 1/1986 | Flander | 384/516 |
| 4,664,535 A * | 5/1987 | Mottate | 384/55 |
| 6,116,786 A | 9/2000 | Takata et al. | |

FOREIGN PATENT DOCUMENTS

| | | |
|---|---|---|
| FR | 848 435 A | 10/1939 |
| FR | 2 801 944 A | 6/2001 |
| JP | 60 026816 A | 6/1985 |

* cited by examiner

*Primary Examiner*—Thomas R. Hannon
(74) *Attorney, Agent, or Firm*—Darby & Darby

(57) ABSTRACT

A 4-point contact ball bearing includes four ring-shaped contact surfaces for forming a ring-shaped raceway between them, each ring-shaped contact surface has a sectional profile defined by a concave curve when cut along a plane including a central axis of rotation of each ball and a central axis of rotation of the ring-shaped raceway. The concave curve is shaped so that it circumscribes the balls and that a curvature thereof is largest at a ball-contact point and is gradually decreased moving away from the ball-contact point. By defining such raceway surfaces, fluctuations in the contact points between the balls and the raceway surfaces due to machining errors can be suppressed, rotational slipping of the balls can be reduced, and differential slip between the balls and the raceway surfaces can also be reduced.

3 Claims, 3 Drawing Sheets

4-POINT CONTACT BALL BEARING

BACKGROUND OF THE INVENTION

1. Field of the Invention

The present invention relates to a 4-point contact ball bearing, and in particular to a 4-point contact ball bearing that can suppress increases in differential slip between balls and raceway surfaces when the contact angles between the balls and the raceway surfaces change due to machining errors in the raceway surfaces and the like.

2. Related Art

As shown in FIG. 3, a typical 4-point contact ball bearing 100 has an outer ring 102, an inner ring 103, and balls 105. The balls 105 are inserted into a ring-shaped raceway formed between an inner circumferential surface of the outer ring 102 and an outer circumferential surface of the inner ring 103 in a manner that 4-point contact can be established. The ring-shaped raceway is defined by a pair of ring-shaped raceway surfaces 106, 107 of the outer ring 102 and a pair of ring-shaped raceway surfaces 108, 109 of the inner ring 103. When a cross-section is taken of the 4-point contact ball bearing 100 in a plane that includes a central axis of rotation, the profile of each ring-shaped raceway surface is defined by an arc that can be circumscribed around the balls 105.

Centers of curvature 106a, 107a, 108a, and 109a of these ring-shaped raceway surfaces 106 to 109 are displaced with one another, so that when a radial load is applied, the balls 105 contact the four ring-shaped raceway surfaces 106 to 109. When an axial load is applied, or when the load conditions are such that the axial load is dominant, the balls 105 of the 4-point contact ball bearing 100 only contact one ring-shaped raceway surface on each of the inner ring 103 and the outer ring 102. This is the same way as when a single-row angular ball bearing is subject to an axial force.

There is only a very slight difference in the radii of curvature between the balls 105 and the arcs defining the four raceway surfaces 106 to 109. Therefore, machining errors in the raceway surfaces 106 to 109 cause large fluctuations in the contact points between the raceway surfaces 106 to 109 and the balls 105. As a result, the contact angles of the balls vary, which greatly affects the bearing performance.

Also, due to elastic deformation of the inner ring 103 and the outer ring 102, the contact between the balls 106 and the raceway surfaces 105 to 109 becomes not point contact but contact within oval surfaces 110 that have a major axis in the direction of the central axis of rotation and a minor axis in a rolling direction of the balls 105. At different positions within these contact surfaces, the distance from the central axis of rotation is not constant for the ball 105 and the raceway rings 102, 103, so that slippage occurs between the outer circumferential surfaces of the balls 105 and the raceway rings 102, 103.

Furthermore, when the contact points of the balls 105 and the raceway surfaces 106 to 109 vary due to machining errors in the raceway surfaces 106 to 109, such as when a gap of distance C is produced between contact center positions 112 and 113, the rotational slipping of the balls 105 becomes worse.

SUMMARY OF THE INVENTION

It is an object of the present invention to provide a 4-point contact ball bearing that can suppress both fluctuations in the contact points between balls and the raceway surfaces and increases in the rotational slipping of the balls due to machining errors in the raceway surfaces and the like, and can suppress differential slip between the raceway surfaces and the balls.

It is a further object of the present invention to propose a method of manufacturing the present 4-point contact ball bearing.

In order to achieve the above and other objects, a 4-point contact ball bearing according to the present invention includes four ring-shaped contact surfaces for defining a ring-shaped raceway. Each of the four ring-shaped contact surfaces has a sectional profile defined by a concave curve when cut along a plane including a central axis of rotation of the ball and a central axis of rotation of the ring-shaped raceway. Further, the concave curve is shaped so that a curvature thereof is largest at a ball-contact point and is gradually decreased moving away from the ball-contact point.

The 4-point contact ball bearing which has the raceway surfaces as defined above can be manufactured by the following steps.

First, the four ring-shaped contact surfaces are approximated by arced surfaces that can circumscribe the balls. Next, lapping balls are prepared which have the same diameter as that of the balls that are component parts of the 4-point contact ball bearing. The arced surfaces are subject to lapping with the lapping balls, whereby the resultant raceway surfaces are obtained. For example, the inner and outer ring members are formed with the arced surfaces and are assembled to form the ring-shaped raceway. Then, the lapping balls are inserted into the ring-shaped raceway, and the arced surfaces are subject to lapping with the lapping balls.

DESCRIPTION OF THE PREFERRED EMBODIMENT

With reference to the attached drawings, an embodiment of a 4-point contact ball bearing according to the present invention will now be described.

Figure 1A:
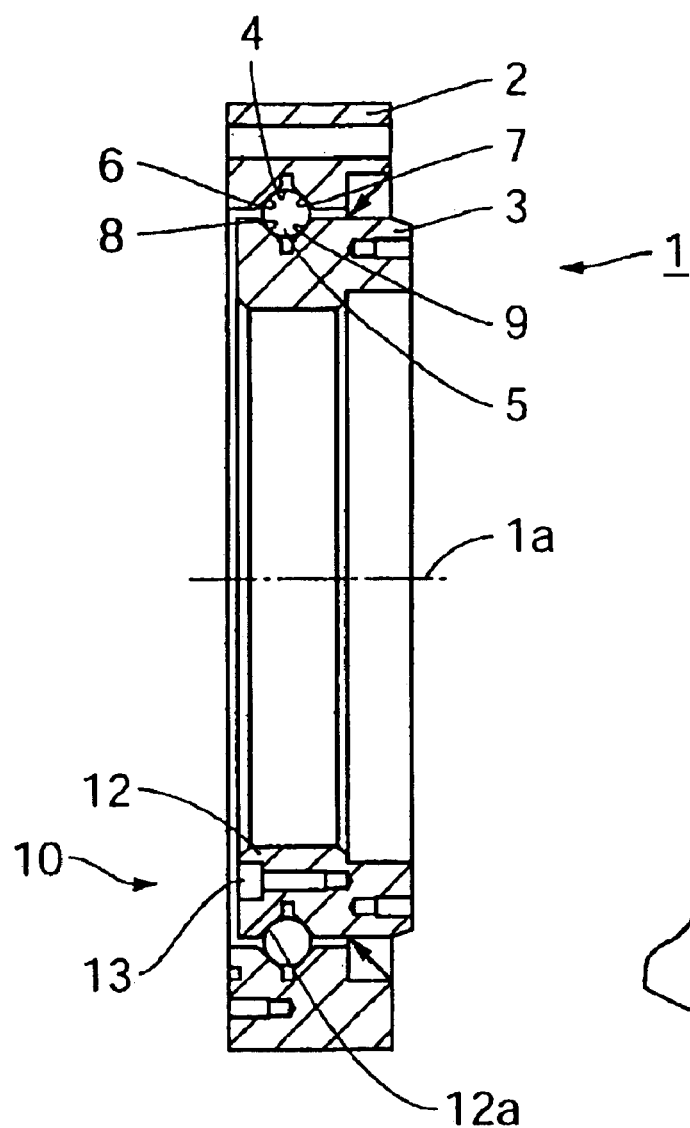
FIGS. 1A and 1B are respectively a cross sectional view and a partial side view showing an example of a 4-point contact ball bearing according to the present invention.
Figure 1B:
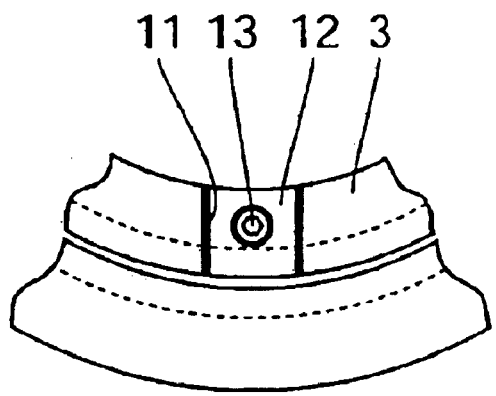

FIGS. 1A and 1B are respectively a cross sectional view and a partial side view showing an embodiment of a 4-point contact ball bearing. As shown in these figures, the 4-point contact ball bearing 1 comprises an integral outer ring 2, an integral inner ring 3, and a plurality of balls 5. The balls 5 are inserted into a ring-shaped raceway 4 formed between the outer ring 2 and the inner ring 3 so as to be free to roll along the ring-shaped raceway 4. A left and right pair of raceway surfaces 6, 7 is formed in the inner circumferential surface of the outer ring 2 and a left and right pair of raceway surfaces 8, 9 is formed in the outer circumferential surface of the inner ring 3.

In the present embodiment, a ball inserting part 10 is formed in a side surface of the inner ring 3. The ball inserting part 10 is constituted by an insertion hole 11 extending from a side surface of the inner ring 3 to the ring-shaped raceway 4, a plug 12 fitted into the insertion hole 11, and a screw bolt 13 for attaching the plug 12 to the inner ring 3. The plug 12 is formed on its end surface facing the ring-shaped raceway 4 with a raceway surface part 12a. The raceway surface 12a is continuous with one of the raceway surfaces, namely the raceway surface 7, formed in the inner ring 3.

Figure 2:
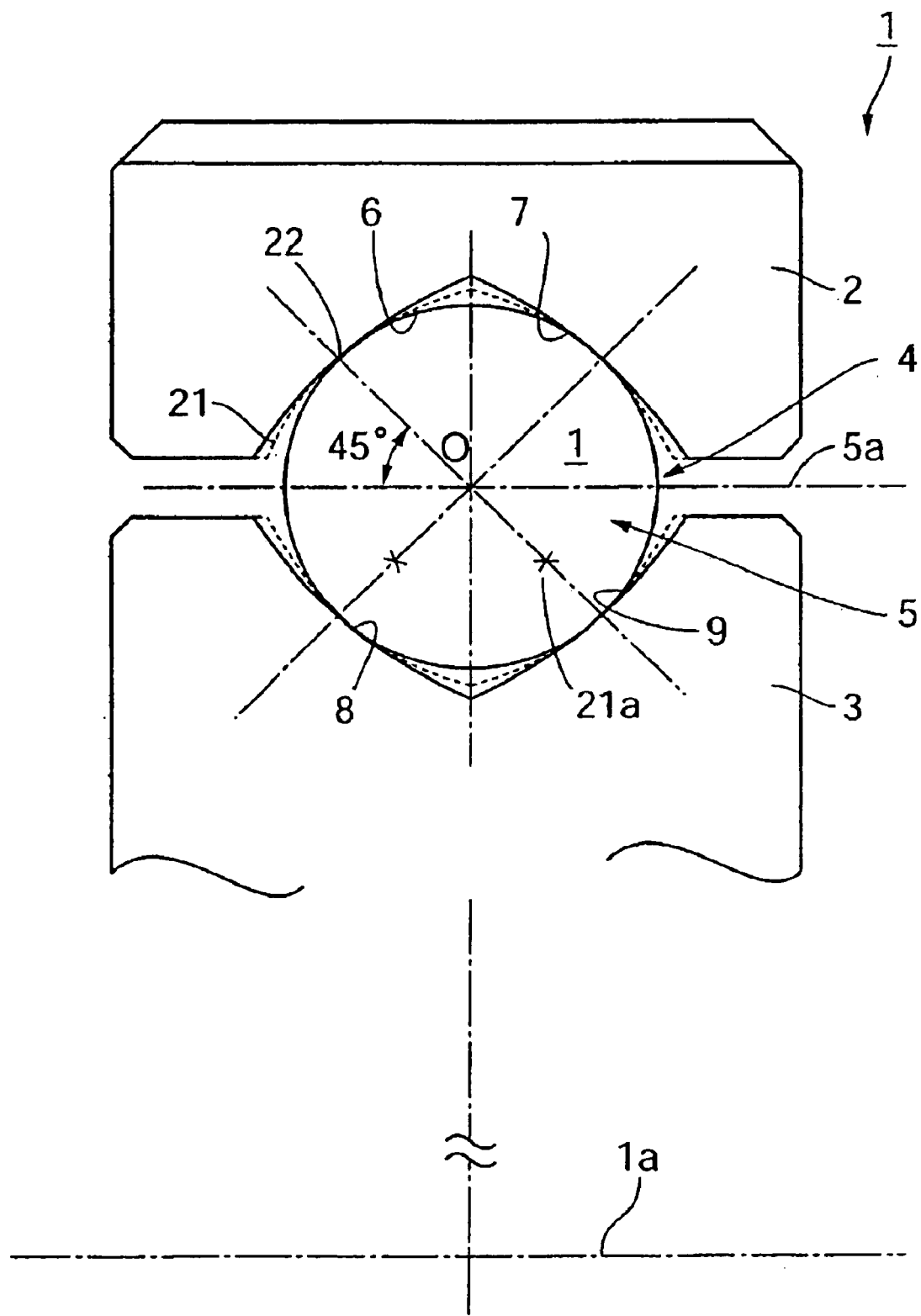
FIG. 2 is an explanatory view showing the concave curves that define the raceway surfaces of the 4-point contact ball bearing of FIG. 1.
Figure 3:
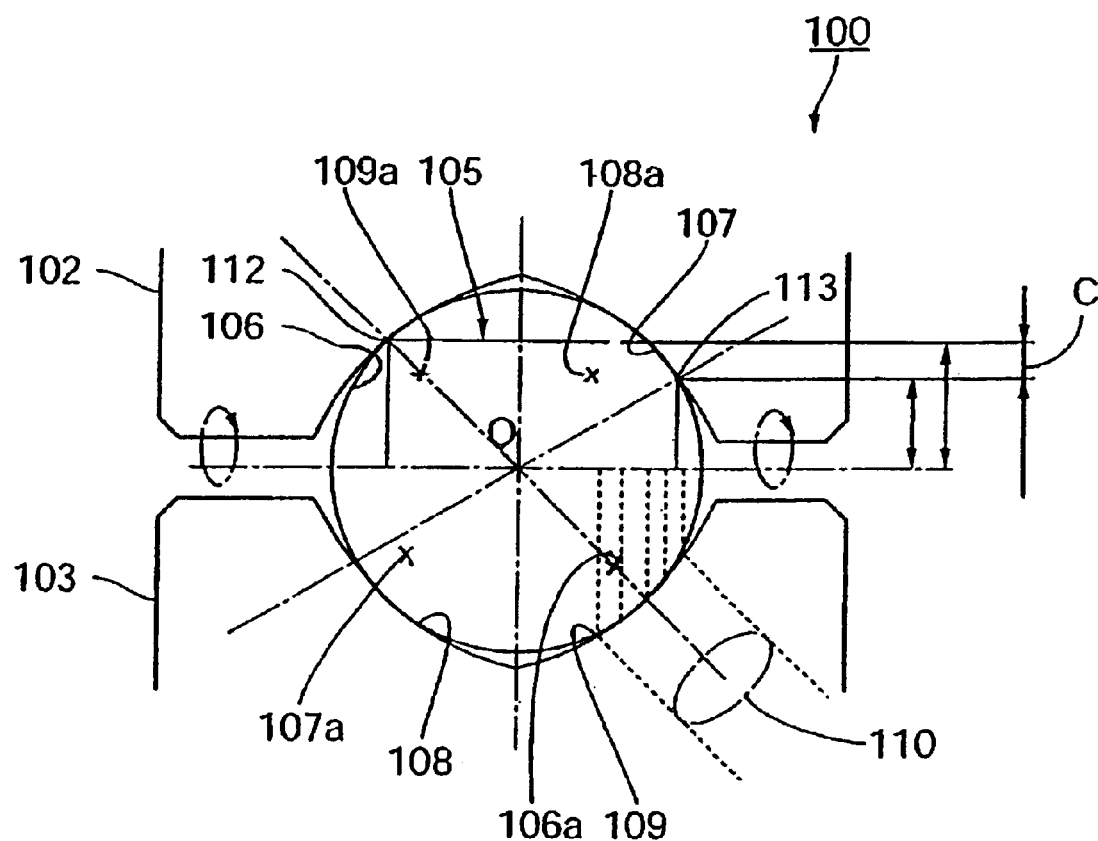
FIG. 3 is an explanatory view showing the problems with a conventional 4-point contact ball bearing.

FIG. 2 is an enlarged partial cross-sectional view showing a cross-sectional shape of the 4-point contact ball bearing 1 taken in a plane that includes a central axis of rotation 1a of the ring-shaped raceway 4 and a central axis of rotation 5a of one of the balls 5. The raceway surfaces 6, 7 and 8, 9 of the present embodiment are defined as follows. First, when viewed along a plane including the central axes of rotation 1a and 5a, contact points 22 between the balls 5 and the raceway surfaces are set at 45 degree positions from the central axis of rotation 5a of the balls 5 (which is to say, the contact angle is set at 45 degrees). Then, the theoretical shape of an arc 21 (shown by dotted line) that circumscribes the balls 5 is drawn using conventional methods so that the center of the arc is positioned at a point denoted by a reference numeral 21a. Thereafter, the arc 21 is modified so that the curvature diminishes moving away from the contact point 22, to thereby obtain a concave curve that defines the raceway surface 6. The remaining raceway surfaces 7, 8, 9 are defined in the same way.

The raceway surfaces 6 to 9 that are defined by these concave curves can be manufactured as follows. First, an inner ring member and an outer ring member are prepared. These members are formed with raceway surfaces that are approximated by arced surfaces that can circumscribe the component balls 5. After the inner and outer ring members are assembled to form a ring-shaped raceway between them, lapping balls that have the same diameter as that of the component balls 5, are inserted into the ring-shaped raceway. Then, the arced surfaces of the inner and outer ring members are subject to lapping with the lapping balls, whereby the outer and inner rings 3, 4 formed with finished raceway surfaces 6, 7 and 8, 9,respectively, are obtained.

In the 4-point contact ball bearing 1 of the present embodiment, since the raceway surfaces 6, 7, 8, 9 are defined in this way, fluctuations in contact points 22 between the raceway surfaces 6, 7, 8, 9 and the balls 5 due to machining errors and the like can be suppressed. Rotational slip of the balls 5 can also be reduced. Since the contact surfaces of the raceway surfaces 6, 7, 8, 9 and the balls 5 can be reduced, differential slip between the raceway surfaces 6, 7, 8, 9 and the balls 5 can also be reduced. In addition, gaps between the raceway surfaces and the balls at parts aside from the contact points 22 are larger than when conventional curved surfaces are used, which is effective for lubrication.

As described above, in the 4-point contact ball bearing of the present invention, the four ring-shaped raceway surfaces constituting the ring-shaped raceway are defined by the curved surfaces whose cross-sectional profile is defined by the concave curve when cut along a plane including the central axis of rotation of the ring-shaped raceway and that of the respective balls. The concave curve is defined such that the curvature is largest at the contact points where the surfaces contact the balls, and that the curvature diminishes along the raceway surfaces away from the contact points.

By defining the raceway surfaces in this way, fluctuations in the positions of the contact points of the balls and the raceway surfaces due to machining errors and the like can be suppressed, so that the rotational slipping of the balls can be reduced. Also, since the contact surfaces between the raceway surfaces and the balls can be reduced, differential slip between the raceway surfaces 6, 7, 8, 9 and the balls 5 is also reduced.

What is claimed is:

1. A 4-point contact ball bearing, comprising:
   an inner ring formed in an outer circumferential surface thereof with two ring-shaped contact surfaces, an outer ring formed in an inner circumferential surface thereof with two ring-shaped contact surfaces, and a ring-shaped raceway formed between the four ring-shaped contact surfaces, and balls inserted into the ring-shaped raceway so that they are free to roll along the ring-shaped raceway, wherein
   each of the four ring-shaped contact surfaces has a sectional profile defined by a concave curve when cut along a plane including a central axis of rotation of each ball and a central axis of rotation of the ring-shaped raceway, and wherein
   the concave curve is shaped so that it circumscribes the ball and that a curvature thereof is largest at a ball-contact point and is gradually decreased moving away from the ball-contact point.

2. A method of manufacturing a 4-point contact ball bearing according to claim 1, comprising steps of:
   approximating the ring-shaped contact surfaces by arced surfaces that can circumscribe the balls;
   lapping the arced surfaces with a lapping ball or lapping balls which have the same diameter as that of the component balls.

3. A method of manufacturing a 4-point contact ball bearing according to claim 2, wherein
   inner and outer ring members are prepared and formed with the arced surfaces;
   the inner and outer ring members are assembled to form a ring-shaped raceway between them;
   the lapping ball or balls are inserted into the ring-shaped raceway; and,
   the arced surfaces are subject to lapping with the lapping balls.

* * * * *